No. 802,405. PATENTED OCT. 24, 1905.
E. R. NEUENFELDT.
SANITARY FROG BASKET.
APPLICATION FILED MAR. 24, 1904.

2 SHEETS—SHEET 1.

Witnesses:
Chas. E. Taylord.
John Enders.

Inventor:
Emil R. Neuenfeldt

No. 802,405. PATENTED OCT. 24, 1905.
E. R. NEUENFELDT.
SANITARY FROG BASKET.
APPLICATION FILED MAR. 24, 1904.

2 SHEETS—SHEET 2.

Witnesses:

Inventor:
Emil R. Neuenfeldt

UNITED STATES PATENT OFFICE.

EMIL R. NEUENFELDT, OF OSHKOSH, WISCONSIN.

SANITARY FROG-BASKET.

No. 802,405.     Specification of Letters Patent.     Patented Oct. 24, 1905.

Application filed March 24, 1904. Serial No. 199,778.

*To all whom it may concern:*

Be it known that I, EMIL R. NEUENFELDT, a citizen of the United States, residing at Oshkosh, in the county of Winnebago and State of Wisconsin, have invented a new and useful Sanitary Frog-Basket, of which the following is a specification.

My invention relates to that class of baskets in which provision is made for the carrying and preserving in a healthy and cool condition of live bait, such as frogs, placed therein.

It has been found that properly to preserve live bait, especially frogs, provision must be made for supplying water to the frogs to keep them damp and to cause the interior of the basket to be kept cool. Attempts have heretofore been made to produce a basket with which the desired results can be obtained by providing a receptacle for water in the bottom of the basket; but such constructions have proved ineffective, as the frogs will not go into the water, and thus soon lose their vitality and become less useful as bait.

One of the objects of my invention is to afford a construction of basket in which through the use of water placed in a trough on the top of the basket the frogs will be kept damp and the air in the basket cool, the construction being such as to cause water placed in the trough to drop or be sprinkled on the backs of the frogs.

Owing to the short season each year for fishing, the item of cost of construction of such a receptacle is an important one. Accordingly a further object is to provide a construction which will be simple in operation and economical in manufacture, thus meeting the demand of the public for an inexpensive device.

The preferred embodiment of my invention is illustrated in the following drawings, in which—

Figure 1:
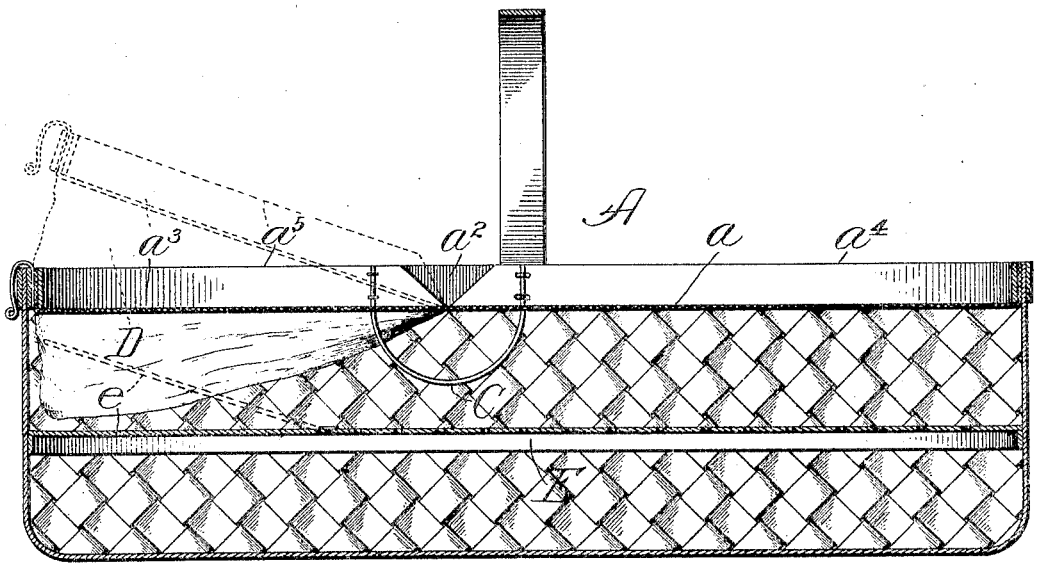
Figure 2:
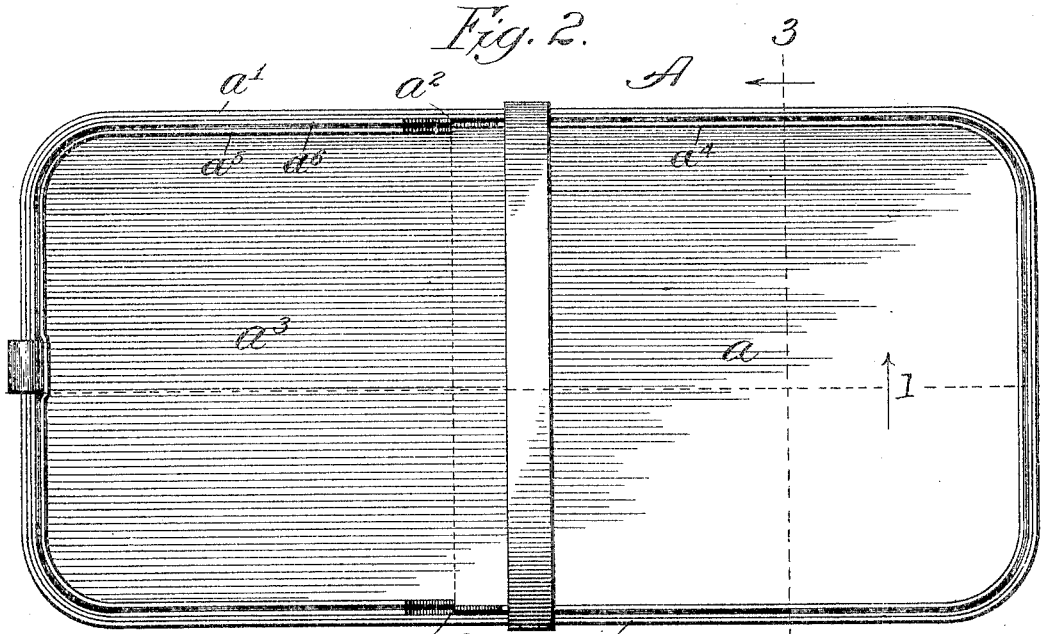
Figure 3:
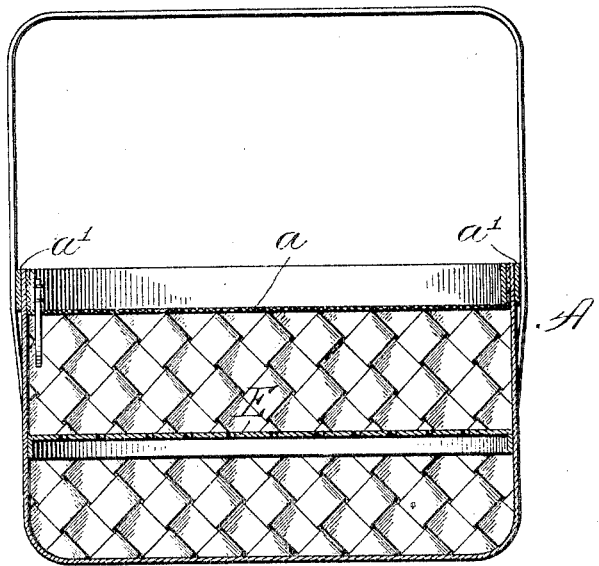
Figure 4:
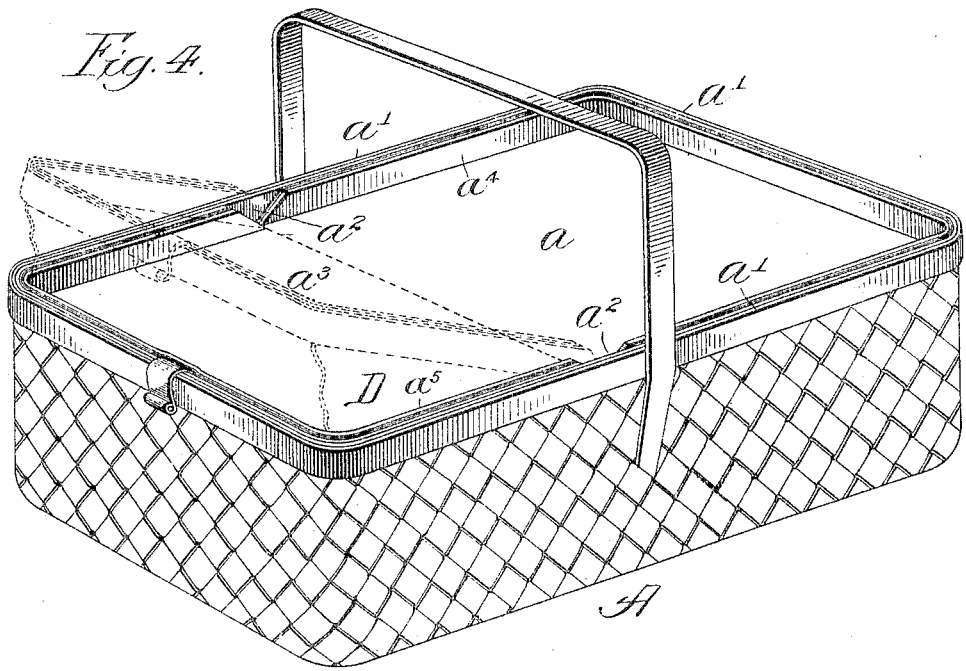

Figure 1 is a view in cross-section taken at line 1 1 on Fig. 2; Fig. 2, a top plan view; Fig. 3, a view in cross-section taken at line 3 3 on Fig. 2, and Fig. 4 a view in perspective of the basket.

A denotes a basket, which may be of the ordinary type of hand-basket having a bail, and provided in its top with a trough $a$ to contain water. I prefer to construct the trough of fabric—as, for example, canvas—which may be secured, as shown, at its edges between binding-strips, as will be hereinafter described.

I prefer to make provision for obtaining access to the interior of the basket in its use by constructing the top of the basket with a binding-strip $a'$ extending around the outer edge and a binding-strip $a^4$ around the inner edge about one portion of the basket and cut away, as shown at $a^2$ in Fig. 2, to form a stationary section of the trough. The strip $a^4$ and the portion of the strip $a'$ adjacent thereto serve to clamp the fabric forming this end of the trough between the strips $a^4$ and the upper edge of the body of the basket. I prefer to construct the other end of the trough to form a swinging cover or door $a^3$ by binding the edges of the fabric forming this end of the trough between binding-strips $a^5$ $a^6$, cut away, as shown at $a^2$ in Fig. 4, thus making the bottom of the swinging cover a continuation of the bottom of the stationary portion of the trough, the fabric constituting the bottom of the trough $a$ thus forming a hinge for the swinging cover $a^3$.

A spring C is rigidly fastened at one of its ends to the inside of the basket and at its opposite end to the swinging cover $a^3$, which tends to hold the swinging cover $a^3$ in normal position against the top of the basket to produce a full-length trough and a complete closure of the top of the basket. Shields D, preferably made from flexible material, such as canvas, secured to the sides of the swinging cover, may be provided to prevent the escape of the frogs at the sides when the swinging cover $a^3$ is raised.

A horizontal partition E, preferably constructed of wood and provided with perforations, may be placed in the basket to form within it two compartments, one above the other, for the frogs, thus increasing the capacity of the basket and permitting the sprinkling or dropping of water upon the backs of the frogs in the lower compartment. The partition E may be provided with a swinging section $e$, suitably hinged to afford access to the lower compartment.

It will thus be seen that the trough of water at the top of the basket not only protects the frogs from the direct heat of the sun, but enables water to be constantly sprinkled or dropped upon the frogs to keep them and the air within the basket damp and comparatively cool, thus preserving the frogs in a healthy and invigorated condition.

While I have shown and described my invention as having a swinging cover or door to permit access to the interior of the basket, I do not limit myself to such a construction, as means for access may be provided in other places in the basket. The essential feature of my invention resides in providing the top of a live-bait basket with a trough for receiving water which shall percolate through the material of the bottom of the trough and enter the frog-receptacle.

What I claim as new, and desire to secure by Letters Patent, is—

1. A basket for live bait, having its top formed into a water-receiving trough provided with a bottom adapted to permit water to percolate through it and extending approximately throughout the entire upper side of the basket, substantially as described.

2. A basket for live bait, having its top formed into a water-receiving trough provided with a bottom adapted to permit water to percolate through it and extending approximately throughout the entire upper side of the basket, and with a swinging cover forming a part of the structure of the top of the basket, to permit of access to the interior of the basket, substantially as described.

3. A basket for live bait, having its top formed into a water-receiving trough provided with a bottom adapted to permit water to percolate through it and extending approximately throughout the entire upper side of the basket, a swinging cover forming a part of the structure of the top of the basket, and a spring secured to the basket and to the swinging cover operating to hold the swinging cover in a normally closed position, substantially as described.

4. A basket for live bait, having its top formed into a water-receiving trough provided with a swinging cover forming a part of the structure of the top of the basket, and with a bottom adapted to permit water to percolate through it extending approximately throughout the entire upper side of the basket, and shields secured to the sides of the swinging cover to prevent the escape of the bait at the side when the swinging cover is raised, substantially as described.

5. A basket for live bait, having its top formed into a water-receiving trough provided with a bottom to permit water to percolate through it extending approximately throughout the entire upper side of the basket, and a horizontal partition in said basket adapted to permit water to percolate through it, located below said trough and dividing the basket into compartments, substantially as described.

6. A basket for live bait, comprising, in combination, a body portion, and a top portion provided about its upper edge with binding-strips, in the form of a trough and formed of a porous material secured at its edges between the binding-strips at the upper edge of the body portion, said top portion having a part of its structure free to be raised or lowered to form a door, whereby the material of the top portion constitutes a hinge, substantially as described.

7. A basket for live bait, having its top formed into a water-receiving trough provided with a bottom adapted to permit water to percolate through it extending approximately throughout the entire upper side of the basket, and a horizontal partition in said basket below said trough dividing the basket into compartments, and provided with a swinging section, said partition being adapted to permit water to percolate through it, substantially as described.

In testimony whereof I have signed my name to this specification in the presence of two subscribing witnesses.

EMIL R. NEUENFELDT. [L. S.]

Witnesses:
   ALMA V. LEUPOLD,
   U. G. CARL.